United States Patent [19]

Condne et al.

[11] Patent Number: 4,784,237

[45] Date of Patent: Nov. 15, 1988

[54] APPARATUS FOR AUTOMATIC RELEASE OF PASSENGER PROTECTION DEVICES IN THE EVENT OF AN ACCIDENT

[75] Inventors: Claus Condne, Wadgassen; Klaus Dobler, Gerlingen; Hansjörg Hachtel, Weissach; Bernhard Mattes, Sachsenheim; Wadym Suchowerskyj, Leonberg, all of Fed. Rep. of Germany

[73] Assignee: Robert Bosch GmbH, Stuttgart, Fed. Rep. of Germany

[21] Appl. No.: 142,863

[22] PCT Filed: Feb. 25, 1987

[86] PCT No.: PCT/DE87/00065

§ 371 Date: Nov. 6, 1987

§ 102(e) Date: Nov. 6, 1987

[87] PCT Pub. No.: WO87/05570

PCT Pub. Date: Sep. 24, 1987

[30] Foreign Application Priority Data

Mar. 22, 1986 [DE] Fed. Rep. of Germany ....... 3609839

[51] Int. Cl.$^4$ .................. B60R 21/00; G01C 9/12; G01C 9/14; G01P 15/03

[52] U.S. Cl. .................... 180/268; 73/488; 73/493; 73/505; 73/510; 73/511; 73/514; 73/530; 73/535

[58] Field of Search ............... 180/268, 269, 270; 280/806, 734; 73/488, 493, 505, 510, 511, 514, 530, 535

[56] References Cited

U.S. PATENT DOCUMENTS

| | | | |
|---|---|---|---|
| 3,038,344 | 6/1962 | Statham | 73/504 |
| 3,240,510 | 3/1966 | Spouce | 180/268 |
| 4,189,022 | 2/1980 | Lazich et al. | 180/268 |
| 4,541,504 | 9/1985 | Lassche | 180/268 |

FOREIGN PATENT DOCUMENTS

| | | |
|---|---|---|
| 2131627 | 12/1972 | Fed. Rep. of Germany . |
| 2316977 | 2/1977 | France . |
| 85/04708 | 10/1985 | World Int. Prop. O. . |

*Primary Examiner*—Kenneth R. Rice
*Attorney, Agent, or Firm*—Michael J. Striker

[57] ABSTRACT

An apparatus for the automatic release of passenger protection devices in motor vehicles in the event of an accident has a sensor (35) having a mass (10) secured outside the center of mass (11). This mass (10) generates a comparably high torque in the suspension in the event of both positional change and rotational acceleration. These torques are detected with known measuring methods and split, with the aid of a high-pass filter (36) and a low-pass filter (40), into a high-frequency and a low-frequency portion. The high frequency portion corresponds to the rotational acceleration, from which the rotational velocity is obtained by means of an integrator (38). The low-frequency portion corresponds to the position of the motor vehicle. Thus both measurement variables that must be detected for releasing a roll bar are obtained with a single sensor (35).

19 Claims, 3 Drawing Sheets

APPARATUS FOR AUTOMATIC RELEASE OF PASSENGER PROTECTION DEVICES IN THE EVENT OF AN ACCIDENT

BACKGROUND OF THE INVENTION

The invention is based on an apparatus for the automatic release of passenger protection devices in motor vehicles in the event of an accident.

It is known for a body serving as a seismic mass to be suspended elastically outside the center of mass, so that this spring/mass system has a resonant frequency that is above the measuring range. The deflection of the mass is a standard for the translational accelerations that occur. Accordingly, the passenger protection device in motor vehicles can be activated with the aid an evaluation circuit.

It is also known for a body serving as a seismic mass to be suspended elastically at the center of mass, so that this spring/mass system has a resonant frequency that is above the measuring range. The deflection of the mass is a standard for the incident angular acceleration.

SUMMARY OF THE INVENTION

The apparatus according to the invention unites the properties of the above two described sensors in one simple apparatus. Both measurement signals, previously obtained separately, can be generated with a single apparatus. With the aid of this sensor signal, after suitable filtering, both the position and the angular velocity can be determined. By evaluating these variables, a driving situation that leads to the overturning of a motor vehicle can be recognized. As a result, it is possible to trigger all the necessary safety provisions, for instance extending a roll bar, in good time. It is also possible to activate additional safety devices in chronological succession. The apparatus is simple and sturdy in structure and is suitable for mass production in motor vehicles. The measurement signal can be obtained simply and accurately by contact-free distance measurement. It is additionally possible to detect the longitudinal acceleration that occurs, for instance in an accident involving a crash.

BRIEF DESCRIPTION OF THE DRAWINGS

Exemplary embodiments of the invention are shown in the drawings and described in further detail in the ensuing description.

DESCRIPTION OF THE EXEMPLARY EMBODIMENTS

In release apparatuses for passenger protection devices, such as roll bars, it is necessary to determine the positional angle of the vehicle with respect to the apparent vertical and the angular velocity about its longitudinal and transverse axis. For reasons of cost, both measurement variables should be furnished by only a single sensor and then re-separated from one another by means of an electronic circuit.

Figure 1:
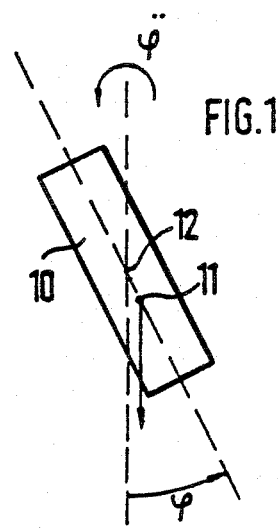
FIG. 1 shows a basic design of the apparatus.

In FIG. 1 a schematic illustration of such a sensor is shown. It comprises a body serving as a seismic mass 10, which is elastically anchored in the anchorage 12 outside the center of mass 11. The mass 10 and the anchorage 12 are selected such that the torque resulting from the mass moment of inertia of the mass with respect to the anchorage, in combination with the maximum angular acceleration to be measured, is of the same order of magnitude as the torque in a positional change of 90° caused by the portion of the mass located outside the anchorage 12. Both in angular acceleration and in a position deviating from the apparent vertical, the seismic mass 10 causes a torque in the anchorage 12 that can be measured, for instance by optical or electrical means.

Figure 2:
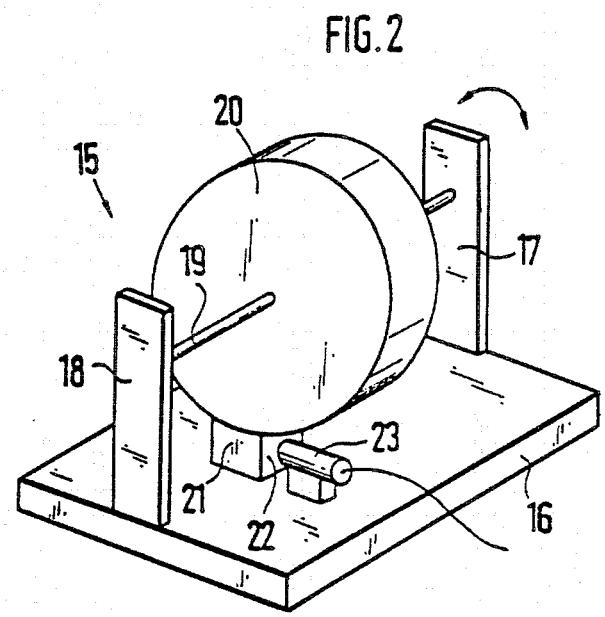
FIGS. 2-3a each show one structural embodiment of the apparatus in a perspective view.

A first exemplary embodiment for this purpose is shown in FIG. 2. An apparatus 15 can be installed in motor vehicles with the aid of a base plate 16. The supports 17, 18 of a suspension means in which a torsion bar 19 is secured are disposed on the base plate 16. Suspended on the torsion bar 19 in a direction at right angles to the axis of the torsion bar 19 is a disk 20, which serves as a seismic mass for the apparatus 15. Instead of a disk, any mass body of an arbitrarily different shape, such as a beam, can also be suspended. However, care must be taken that the mass body be eccentrically supported. An extension 21 that, as an additional mass, effects the mass eccentricity of the disk 20 is formed on the outer circumference of the disk 20. The extension 21 also has a measuring face 22, with which a distance sensor 23 disposed stationary on the base plate 16 is associated. Any known types of sensor for contact-free distance measurement can be used as the distance sensor 23, for instance capacative, inductive, magnetic, or optical systems, or eddy-current measuring systems. The distance sensor 23 is positioned on the base plate 16 in such a way that it can detect even the small rotational movements of the disk 20 with maximum accuracy. Naturally it is also possible to suspend the mass body resiliently via spiral or leaf springs.

If acceleration forces act upon the disk 20 of the apparatus 15 in the event of an accident, then the disk 20 is deflected out of its basic position. Two cases, of a slow rotation and an accelerated rotation, must be distinguished from one another. In the case of a slow rotation of the disk 20 about the axis of the torsion bar 19, its weight, together with the torsional force which however counteracts it, leads to a change in the distance between the measuring face 22 and the distance sensor 23. This deflection now serves as a standard for the angular position with respect to the horizontal, by means of which the position of the motor vehicle can be determined.

If the apparatus 15 and in particular the disk 20 having the extension 21 is rotated in an accelerating fashion, then the mass inertia of the disk 20 and the mass of the extension 21 likewise produce a change in the distance between the measuring face 22 and the distance sensor 23. Via the distance measurement, a measurement signal for the incident angular acceleration, and from it the rotational velocity of the motor vehicle, is attainable. The measurement signal obtained for the angular change $\phi$ is differentiated, in an electronic evaluation circuit connected to the system, into the corresponding velocity value $\dot{\phi}$ and acceleration value $\ddot{\phi}$. The further processing of the measurement signal obtained can be done with the aid of an electric evaluation circuit that is shown in further detail in FIG. 4.

Naturally it is also possible for the seismic mass to be distributed unequally inside the body form, so as to attain an eccentric support of the mass or body. In all the various forms of the seismic mass, however, it is important that the measuring face and the distance sensor be associated precisely with one another and that even the smallest variations be detected, as much as possible, without error.

Figure 2A:
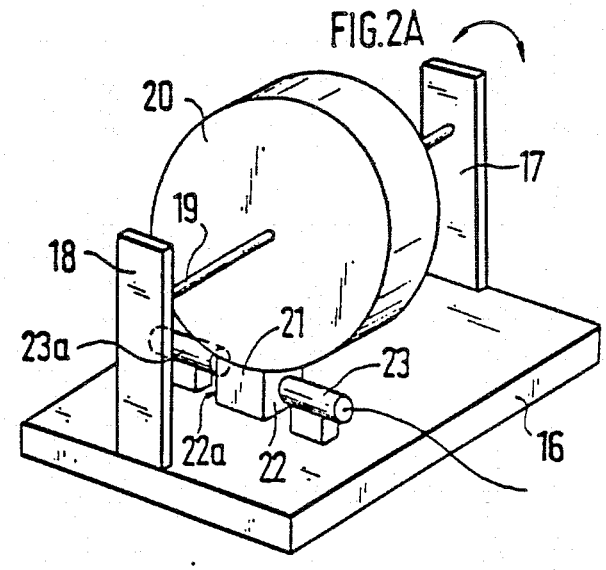

It is particularly advantageous—as shown in FIG. 2a—to provide a second measuring face 22a and a second distance sensor 23a diametrically opposite one another on the extension 21. With the aid of a so-called half-bridge circuit, the measurement signal can thus be doubled. Interference or drifting of the measured value occurring during the measurement, for instance as a result of temperature fluctuations, can also be suppressed.

With the aid of the apparatus described above, it is possible to determine the change in position for the angular acceleration with respect to only one axis of the motor vehicle. If a second apparatus is disposed at right angles to the first, then both values can be obtained with respect to both axes. Both apparatuses can be connected to the same evaluation circuit.

Figure 3:
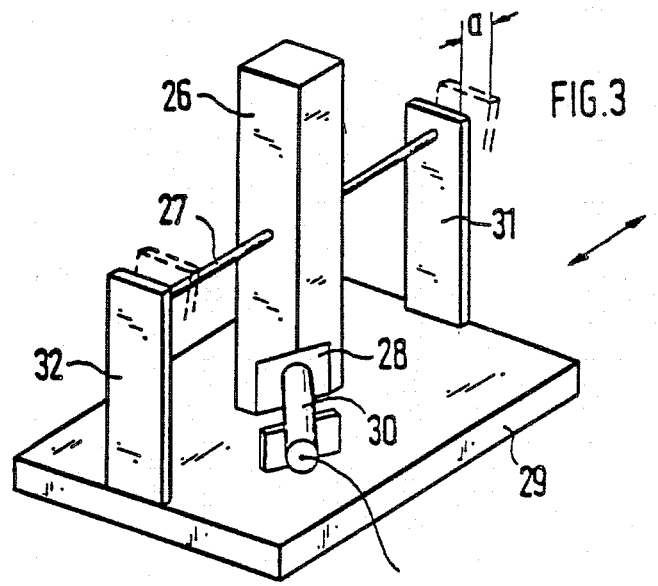

In the exemplary embodiment of FIG. 3, not only the position and the rotational acceleration but also the longitudinal acceleration can be measured with one and the same apparatus. Such longitudinal accelerations arise for instance in an accident involving a crash. As in the exemplary embodiment of FIG. 2, a seismic mass, in this case a beam 26, is suspended eccentrically and resiliently from a torsion bar 27. The beam 26 has a measuring face 28 that is disposed at a predetermined angle, for instance 45°, with respect to the axis of the torsion bar, and a distance sensor 30 secured in a stationary manner on a base plate 29 is associated with the measuring face 28.

Figure 3A:
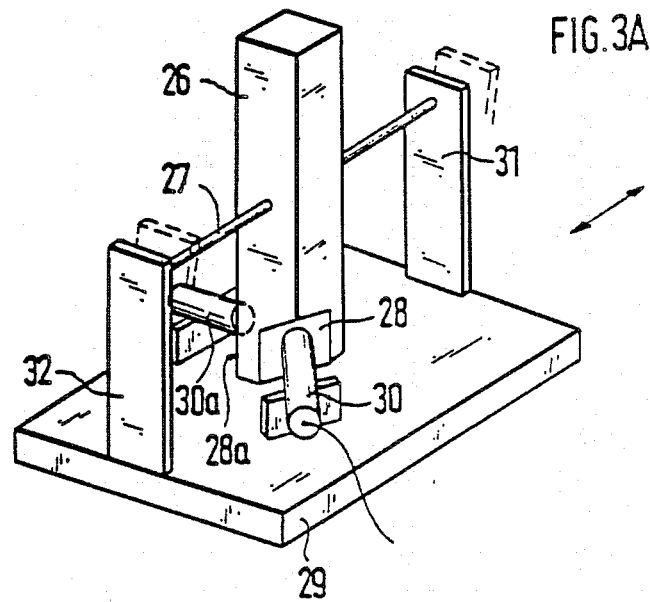

The supports 31, 32 of the apparatus, in contrast to the exemplary embodiment of FIG. 2, are embodied as elastically resilient in the direction of the axis of the torsion bar 27. The axis of the torsion bar 27 is aligned in the direction of the longitudinal axis of the vehicle. Upon the occurrence of an acceleration or deceleration in this direction, the supports 31, 32 are deflected by an amount "a", which also produces a proportional change in the distance between the measuring face 28 and the distance sensor 30. Since as is well known, the course of a crash event over time is different from that of an overturning event, it can be recognized by taking suitable steps, with the aid of an electronic evaluation circuit. It is also possible, however, to obtain the measurement signals for the crash event and for the overturning event separately from one another, with the aid of the exemplary embodiment of FIG. 3. To this end, in FIG. 3a, a second measuring phase 28a is provided at right angles to the axis of the torsion bar 27. A separate distance sensor 30, 30a is then associated with each of the two measuring faces 28, 28a. The obliquely embodied measuring face described above then no longer needs to be provided. This is because it is possible to embody the measuring faces in each direction of movement, that is, in the direction of the axis of the torsion bar and at right angles to the axis of the torsion bar.

As in the exemplary embodiment of FIG. 2a, once again measurement errors or drifting can be compensated for by means of diametrically opposed measuring faces and a separate distance sensor associated with each of them, or the measured value can be doubled via a so-called half-bridge circuit.

Figure 4:
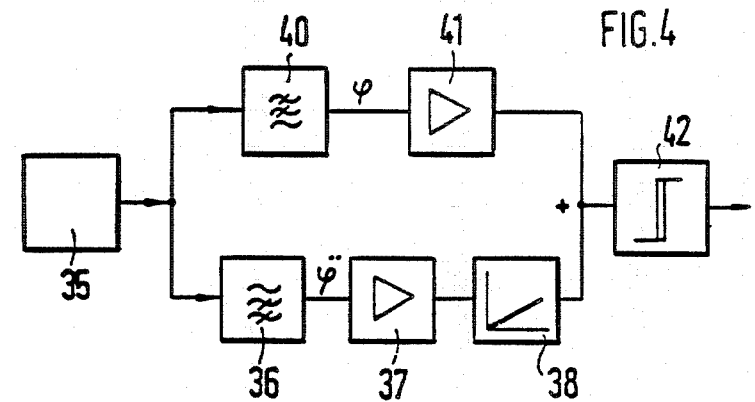
FIG. 4 is a block circuit diagram of the evaluation circuit for releasing a roll bar.

In FIG. 4, a block circuit diagram is shown in which the above-described sensor is indicated at 35. Its output signal, which corresponds to a superposition of position and angular acceleration, is separated, that is, filtered, into the two variables of angular acceleration and location, so that the driving situation can be evaluated.

This filtering of the measurement signal will now be described, taking two limit cases as examples. If the vehicle overturns rapidly (rotation), then the rotational velocity, that is, the angular velocity of the motor vehicle, is the essential criterion for releasing the safety device. The vehicle in that case has a high rotational energy. The rapid rotation of the motor vehicle is caused by a relatively high-frequency angular acceleration. This means that only the high-frequency portion of the measurement signal needs to be evaluated. To this end, the measurement signal is carried to a high-pass filter 36, which allows the high-frequency portion of the measurement signal to pass through and filters out the low-frequency portion. After that, the high-frequency portion is amplified in an amplifier 37 and integrated in an integrator 38. The angular velocity obtained in this way releases the safety devices when a predetermined threshold is exceeded.

The second limit case is a slow overturning of the motor vehicle, for instance if the motor vehicle runs along an embankment and tips over at a critical angle of inclination. In this case the angular acceleration is low. The essential criterion for release is now the position with respect to the apparent vertical. The measurement signal brought about by this change in position is of relatively low frequency. This means that in the case of slow rotation, the low-frequency portion of the measurement signal must be evaluated. To this end, the measurement signal obtained from the sensor 35 is supplied to a low-pass filter 40. The measurement signal thus obtained is supplied to an amplifier 41. If a predetermined threshold is exceeded, once again the passenger safety devices are released.

Figure 5:
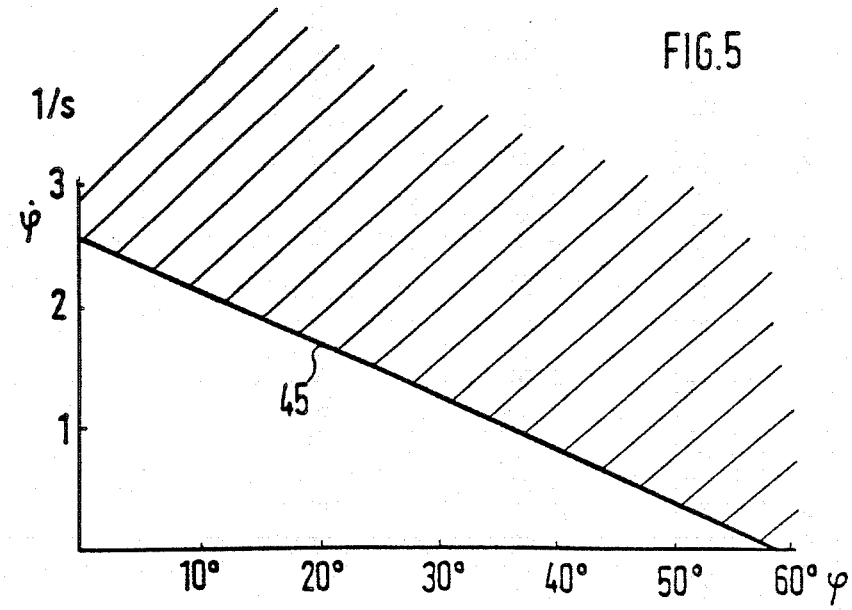
FIG. 5 is a diagram that shows the course of the release threshold as a function of the angular velocity and the tipping angle of the motor vehicle.

In actual driving of the motor vehicle, the two limit cases overlap. The above-described release apparatus should be augmented with a window discriminator 42. The two filtered measurement signals are added together and supplied to the window discriminator 42, which can release the particular safety devices desired. In FIG. 5, a diagram for rollover of the motor vehicle about one of its axes is shown. Here the rotational velocity of the speed is plotted over its angle of inclination. The limit cases are to be understood here as points of intersection with the Y and X axis, respectively. In the case of a slow rollover of the motor vehicle, the passenger protection devices are released at a threshold of approximately 57° of inclination of the motor vehicle. For a rapid rollover, the threshold is plotted in FIG. 5, for a very specific type of vehicle, at an angular velocity of 2.5 1/sec. The curve joining these two limit cases as plotted in the diagram indicates the critical threshold 45 beyond which the safety devices should be released. For instance if the motor vehicle has already attained an inclination of 20°, then only a slight rotational energy, that is, angular velocity, is sufficient to put the motor vehicle into the critical position, that is, above the critical threshold 45. In this example, the safety devices would release at a simultaneous angular velocity of 1.7 1/sec.

In the case of rollover of the motor vehicle about its transverse axis as well, this same evaluation apparatus can be used. Necessary changes dictated by the geometry of the motor vehicle can already be taken into account when the selection of the sensor is made.

We claim:

1. An apparatus for the automatic release of passenger protection devices in motor vehicles in the event of an accident, comprising:
    a sensor (35) formed to emit a control signal upon deviation form a prescribed driving situation of the motor vehicle, said sensor (35) including an anchorage (12) and a seismic mass (10) with a center of mass (11), said seismic mass (10) being elastically anchored outside said center of mass (11), said seismic mass (10) being formed to produce a torque in said anchorage (12) so that said sensor (35) simultaneously measures at least a positional angle with respect to an apparent vertical and an angular acceleration of the motor vehicle; and
    electrical circuit means for splitting said control signal into at least two ranges.

2. An apparatus as defined by claim 1; and further comprising:
    means for obtaining said control signal and including means for relative positional measuring of a distance between the "seismic" mass (10) and a sensor (23, 30) contact-free.

3. An apparatus as defined by claim 1 and further comprising:
    means for obtaining a positional change of the seismic mass (10) and including optical means.

4. An apparatus as defined by claim 1 and further comprising:
    a torsion bar (19) secured to said mass (10, 20).

5. An apparatus as defined by claim 1; and further comprising:
    a spring suspending said mass (10, 20).

6. An apparatus as defined by claim 1, characterized in that the seismic mass is embodied as disk (20) and has an extension (21) serving as a measuring face (22).

7. An apparatus as defined by claim 1, characterized in that the seismic mass is embodied as a beam (26).

8. An apparatus as defined by claim 2, characterized in that the mass (10, 20) is supported movably in; and further comprising;
    a sensor (23) being formed to determine a motion of said seismic mass in said one direction.

9. An apparatus as defined by claim 7, characterized in that said seismic mass (10) is movably supported in two directions extending at right angles to one another, said sensor (30) being formed to determine a motion of said seismic mass (10, 26) in both said directions so that a longitudinal acceleration can be determined.

10. An apparatus as defined by claim 7, characterized in that said seismic mass (10, 27) has a plurality of directions of motion and that said beam has a measuring face (28) that is disposed at an angle between 0°–90° with respect to one of the directions of motion of said seismic mass (10, 27).

11. An apparatus as defined by claim 10, characterized in that said measuring face (28) is arranged at an angle of 45° with respect to one of the directions of motion; and further comprising:
    a sensor (30) disposed at right angles to said measuring face (28).

12. An apparatus as defined by claim 9, characterized in that the mass (10, 20, 26) has one measuring face in each of the directions of motion further comprising a separate sensor associated with each measuring face.

13. An apparatus as defined by claim 12, characterized in that the mass (10, 20, 26) has two diametrically opposed measuring faces each having an associated one of said separate sensors.

14. An apparatus as defined by claim 1, wherein said electrical circuit means includes a high-pass filter (36) formed to obtain a high-frequency range of said control signal, and a low-pass filter (40) being formed to obtain a low-frequency range of said control signal.

15. An apparatus as defined by claim 14, characterized in that said electrical circuit means further includes an integrator (38) connected to an output side of said high-pass filter (36), said high-pass filter (36) and said low-pass filter (40) being formed to provide ranges of said control signal, said electrical circuit means also including an amplifier (41) for weighting said ranges, and including a comparator (42) responsive to an addition of said ranges weighted by said amplifier for releasing the passenger protection devices.

16. An apparatus as defined in claim 15; further comprising:
    releasing means responsive to a utilization of a translational sensitivity of said seismic mass (10) after filtering of said control signal for releasing additional passenger protection devices such as an air bag, belt tightener, central lock system and belt block system.

17. An apparatus as defined in claim 16, characterized in that said releasing means has a plurality of release stages each associated with a release of a respective one of the passenger protection devices so as to release the passenger protection devices at different points in time.

18. An apparatus as defined in claim 2 and further comprising:
    means for obtaining a positional change of the seismic mass (10) and including optical means.

19. An apparatus as defined by claim 9, characterized in that said seismic mass (10, 27) has a plurality of direction of motions and that said beam has a measuring face (28) that is disposed at an angle between 0°–90° with respect to one of the directions of motion of said seismic mass (10, 27).

* * * * *